United States Patent
Zhan et al.

(10) Patent No.: US 6,905,649 B2
(45) Date of Patent: Jun. 14, 2005

(54) HIGH-DENSITY BARIUM TITANATE OF HIGH PERMITTIVITY

(75) Inventors: Guodong Zhan, Davis, CA (US); Amiya K. Mukherjee, Davis, CA (US); Joshua D. Kuntz, Lafayette, CA (US); Julin Wan, Schenectady, NY (US)

(73) Assignee: The Regents of the University of California, Oakland, CA (US)

( * ) Notice: Subject to any disclaimer, the term of this patent is extended or adjusted under 35 U.S.C. 154(b) by 256 days.

(21) Appl. No.: 10/413,438

(22) Filed: Apr. 11, 2003

(65) Prior Publication Data

US 2004/0201137 A1 Oct. 14, 2004

(51) Int. Cl.$^7$ ............................. H05B 7/20; C04B 35/468
(52) U.S. Cl. ..................... 264/434; 264/455; 264/483; 501/137
(58) Field of Search .................... 501/137; 264/434, 264/455, 483

(56) References Cited

U.S. PATENT DOCUMENTS 5,990,028 A   11/1999   Roethlingshoefer et al.
6,395,214 B1   5/2002   Kear et al.

FOREIGN PATENT DOCUMENTS

EP   0992468 A1 * 12/2000  ......... C04B/35/447

OTHER PUBLICATIONS

Takeuchi et al., "Spark–plasma–sintering of fine $BaTiO_3$ powder prepared by a sol–crystal method", *Journal of Materials Science* 36:2329–2334 (2001), no month provided.

Takeuchi et al., "Preparation of fine–grained $BaTiO_3$ ceramics by spark plasma sintering", *J. Mater. Res.*, 17:3: 575–581 (2002), no month provided.

Takeuchi et al., "Preparation of Dense $BaTiO_3$ Ceramics with Submicrometer Grains by Spark Plasma Sintering", *J. Am. Ceram. Soc.* 82:4: 939–943 (1999), no month provided.

Xu et al., "Tetragonal Nanocrystalline Barlum Titanate Powder: Preparation, Characterization, and Dielectric Properties", *J. Am. Ceram. Soc.* 86:1: 203–205 (2003), no month provided.

Choi et al., "Hydrothermal Synthesis of Spherical Perovskite Oxide Powders Using Spherical Gel Powders", *J. Am. Ceram. Soc.* 81:5: 1353–1356 (1998), no month provided.

Hu et al., Wet–chemical synthesis of monodispersed barium titanate particles–hydrothermal conversion of $TiO_2$ microspheres to nanocrystalline $BaTiO_3$ *Powder Technology* 110: 2–14 (2000), no month provided.

Wang et al., "Densification of $Al_2O_3$ powder using spark plasma sintering", J. Mater. Res., 15:4:982–987 (2000), no month provided.

* cited by examiner

Primary Examiner—David Brunsman
(74) Attorney, Agent, or Firm—M. Henry Heines; Townsend and Townsend and Crew, LLP

(57) ABSTRACT

A nano-sized powder of barium titanate is compacted and sintered by spark plasma sintering under conditions creating a high heating rate to achieve a densified material that demonstrates superior permittivity.

21 Claims, 4 Drawing Sheets

HIGH-DENSITY BARIUM TITANATE OF HIGH PERMITTIVITY

STATEMENT AS TO RIGHTS TO INVENTIONS MADE UNDER FEDERALLY SPONSORED RESEARCH OR DEVELOPMENT

This invention was made with Government support under Contract No. G-DAAD 19-00-1-0185, awarded by the United States Army Research Office. The Government has certain rights in this invention.

BACKGROUND OF THE INVENTION

1. Field of the Invention

This invention resides in the technology of ceramic dielectric materials, and particularly barium titanate.

2. Description of the Prior Art

Barium titanate ($BaTiO_3$) is a ferroelectric material whose high permittivity at room temperature has made it a material of interest in the manufacture of thermistors, multilayer ceramic capacitors (MLCCs), electro-optic devices, and as a capacitor material in down-sized portable machines and dynamic random access memories (DRAMs). With the ever higher temperatures and voltages to which these devices are exposed and the continuing demand for smaller and lighter components, there is an ever increasing need for barium titanate materials that perform reliably, that store energy at a high density, and that maintain a high capacitance.

One of the features of barium titanate that has been investigated for its influence on permittivity is the grain size. The results of these investigations have been reported in the literature, examples of which are Ota, T., J. Takahashi, and I. Yamai, "Effect of microstructure on the dielectric property of ceramics," *Key Engineering Materials*, Volumes 66 and 67 (1995), pages 185–246; and Takeuchi, T., Y. Suyama, D. Sinclair, and H. Kageyama, "Spark-plasma-sintering of fine $BaTiO_3$ powder prepared by a sol-crystal method," *J. Mater. Sci.* 36 (2001), pages 2329–2334. According to these reports, the dielectric constant of barium titanate is independent of the grain size for grain sizes greater than 2 microns, where the value of the dielectric constant at 25° C. is about 2,000. For smaller grain sizes, i.e., within the range of 0.7 micron to 2 microns, the dielectric constant at 25° C. rises above 2,000 to a maximum of about 5,000 at a grain size of approximately 1.0 micron. For grain sizes below 0.7 micron, the dielectric constant is again lower, decreasing with decreasing grain size.

Dielectric constants higher than 2,000 have been achieved by the use of spark plasma sintering to densify the barium titanate compacts. Two studies by Takeuchi report dielectric constants of about 7,000 obtained in this manner. Takeuchi, T., Y. Suyama, D. Sinclair, and H. Kageyama, "Spark-plasma-sintering of fine $BaTiO_3$ powder prepared by a sol-crystal method," *J. Mater. Sci.* 36 (2001), pages 2329–2334; Takeuchi, T., M. Tabuchi, and H. Kageyama, "Preparation of dense $BaTiO_3$ ceramics with submicrometer grains by spark plasma sintering," *J. Am. Chem. Soc.* 82 [4] 939–943 (1999). In both cases, the density of the sintered product was about 98% of theoretical density. Spark plasma sintering is a means of densification, which might suggest that further densification would lead to an even higher dielectric constant. While density is in some cases related to grain size, the findings of Ota et al. (referenced above), however, suggest that decreasing the grain size would be expected to lower the dielectric constant rather than to raise it.

SUMMARY OF THE INVENTION

Contrary to the expectations raised by the prior art, it has now been discovered that a barium titanate material can be prepared that exhibits both a density exceeding 98% of theoretical density and a permittivity that is significantly higher than barium titanate permittivities reported in the literature. In contrast to reports in the literature, notably those of Ota et al. (1995) and Takeuchi et al. (2001) referenced above, the present invention establishes that the maximum value of the permittivity of barium titanate occurs not at a grain size of 1.0 micron as these authors report, but instead at grain sizes much lower than 1.0 micron, notably in the nano-size range, and that the permittivity values with grains sizes in the nano-size range are much larger than the value at the 1.0 micron grain size. It has further been discovered that with appropriate processing conditions full-density barium titanate can be prepared, and it is believed that the high density achieved by the process of this invention is cause of the high permittivity.

Barium titanate with these qualities is achieved by forming a consolidated mass from barium titanate particles in the nano-size range, and sintering the mass by spark plasma sintering under conditions that include a heating rate that is significantly higher than that of the prior art. Although some grain growth occurs during the sintering, the grain growth is not enough to significantly affect the density or the dielectric constant, and the resulting grains are still smaller than those obtained in the prior art. Nor does the sintering cause a significant drop in the Curie temperature, which remains close to that of coarse-grained barium titanate. A still further benefit achieved by this invention is a sintered material with a low loss tangent, i.e., one that is close to zero over a wide temperature range. With these advantages, barium titanate that has been processed in accordance with this invention is particularly useful as a dielectric material, offering performance capabilities that exceed those of the prior art.

Details of these and other features, advantages and objects of this invention will be apparent from the description that follows. All literature references cited in this specification are incorporated herein by reference for their descriptions of the subject matter in the contexts of which the citations are made.

DETAILED DESCRIPTION OF THE INVENTION AND PREFERRED EMBODIMENTS

Figure 1:
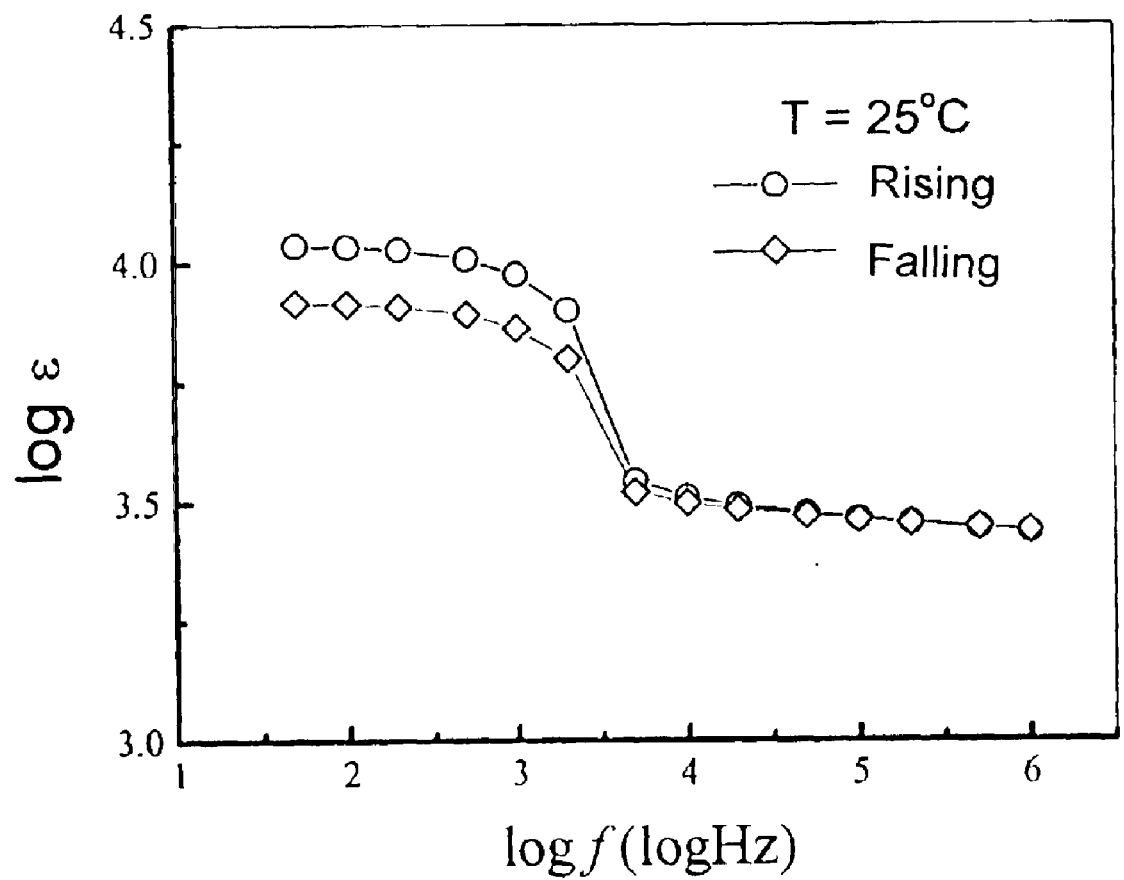
FIG. 1 is a plot showing the variation of permittivity with frequency at 25° C. for a barium titanate material sintered in accordance with the present invention.

Barium titanate is a widely used ceramic that can be obtained in powder form from major suppliers to the chemical industry. Various methods of synthesizing barium titanate are known in the art. Two of the most common methods are the sol-crystal method and the hydrothermal method.

The sol-crystal method begins with the formation of organometallic crystals which are then decomposed at elevated temperature. Typically, crystals of barium titanium alkoxide, such as $BaTi[OCH(CH_3)_2]_6 \cdot C_6H_6$, ranging in size from a few millimeters to 1 cm, are grown from a solution in an organic solvent at a low temperature such as 5° C., then heated to approximately 100° C. to form $BaTiO_3$ as a fine powder. The hydrothermal method involves dispersing a gel powder of $TiO_2$ in water followed by the addition of $Ba(OH)_2 \cdot (H_2O)_8$, using a slight excess of the latter, to form an alkaline solution with a pH exceeding 10. The suspension is then heated to about 110° C. in an autoclave for several hours. The hydrothermal method is a preferred synthesis method, and barium titanate particles prepared by this method are preferred for use as starting materials in the process of this invention, since the hydrothermal method tends to produce a higher purity product. Detailed descriptions of hydrothermal syntheses of barium titanate are found in Choi, J. Y., C. H. Kim, and D. K. Kim, "Hydrothermal synthesis of spherical perovskite oxide powders using spherical gel powders," *J. Am. Ceram. Soc.* 81 [5]: 1353–1356 (1998); and Hu, M. Z.-C., V. Kurian, E. A. Payzant, C. J. Rawn, and R. D. Hunt, "Wet-chemical synthesis of monodispersed barium titanate particles—hydrothermal conversion of $TiO_2$ microspheres to nanocrystalline $BaTiO_3$," *Powder Technology* 110: 2–14 (2000). In general, any synthesis process that produces barium titanate of a purity equivalent to that produced by the hydrothermal process is a preferred process for the purposes of this invention.

The barium titanate particles used as a starting material in the practice of this invention are nano-sized particles. The prefix "nano-" as used herein generally refers to dimensions that are on the order of 100 nm or less. Thus, preferred barium titanate particles for use herein, which will ultimately form the grains of the consolidated compact and the sintered product, are those having diameters of about 100 nm or less. Preferred average particle sizes are those within the range of from about 10 nm to about 100 nm, and most preferably from about 10 nm to about 75 nm. During the sintering process, a certain amount of grain growth can occur, and this may result in an increase in the grain size to a diameter in excess of 100 nm. Preferably, the sintering conditions are controlled to limit the grain growth to a final grain size that does not exceed about 500 nm in diameter, preferably not exceeding about 300 nm in diameter, more preferably not exceeding about 250 nm in diameter, and most preferably not exceeding about 200 nm in diameter.

The dielectric properties of the product may be influenced by the phase composition of the product, and this can be controlled to some extent by the selection of the phase composition of the barium titanate used as a starting material. The two predominant crystal phases of barium titanate are tetragonal and cubic, and it is believed that the cubic phase has as higher dielectric constant. This suggests that for multi-phase products, the higher the proportion of cubic phase the higher the dielectric constant. A certain degree of phase change may occur during the sintering process, i.e., a conversion from cubic phase to tetragonal phase, and accordingly, the selection of process conditions that will minimize this degree of change may result in a higher dielectric constant in the final sintered product. Although the proportion of each phase may vary and is not critical to this invention, sintered products in which the cubic phase constitutes at least about 50% (on a volume basis) are preferred.

Spark plasma sintering is performed by passing a pulsewise DC electric current through the powder mixture, or through a compacted form of the powder mixture, while pressure is applied. A description of this method and of apparatus in which the method can be performed is presented by Wang, S. W., et al., "Densification of $Al_2O_3$ powder using spark plasma sintering," *J. Mater. Res.* 15(4), 982–987 (2000). The application of spark plasma sintering to barium titanate is described by Takeuchi and co-workers in Takeuchi et al. (2001) (cited above), Takeuchi et al. (1999) (cited above), and Takeuchi, T., C. Capiglia, N. Balakrishnan, Y. Takeda, and H. Kageyama, "Preparation of fine-grained $BaTiO_3$ ceramics by spark plasma sintering," *J. Mater. Res.* 17[3]: 575–581 (2002).

In the practice of the present invention, spark plasma sintering is performed in a manner that causes the temperature of the compact to rise to a sintering temperature at a rate which has its greatest influence on the properties of the final product at temperatures above about 600° C. Thus, the heating rate at temperatures below and up to about 600° C. is not critical and can vary, but once the compact reaches about 600° C., the beneficial product qualities claimed herein are achieved by increasing the temperature further at a heating rate of at least about 350° C. per minute. Preferably, the heating rate at temperatures above 600° C. is within the range of about 350° C. per minute to about 750° C. per minute, and most preferably from about 400° C. per minute to about 550° C. per minute. Heating is allowed to continue to the sintering temperature, where the compact is held for a period of time. The sintering temperature is preferably above 900° C., more preferably within the range of from about 900° C. to about 1,100° C., and most preferably within the range of from about 950° C. to about 1,050° C. The length of time during which the compact is held at the sintering temperature is preferably from about 1 minute to about 10 minutes, and most preferably from about 2 minutes to about 5 minutes. The heating rate at temperatures above about 600° C. is the most critical parameter of the process toward achieving a small grain size and a density approaching full density, and the faster the heating rate in this range, the higher the density and the higher the dielectric constant. Once the sintering temperature is reached, the sintering temperature itself and the length of time that the sintering temperature is maintained can be varied to minimize the grain growth. A shorter duration will generally result in less grain growth, and the use of a higher sintering temperature can compensate for a shorter duration of exposure at the sintering temperature while achieving the same or equivalent results. The choice of sintering temperature will be governed in many cases by economic and equipment-related considerations, such as the capacity of the sintering apparatus, the safety of the process, and the cost of the energy consumed in the process.

The heating rate and the sintering temperature can be controlled by adjustment of the parameters of the electric current applied to the compact. The optimum level of each system parameter is readily determinable by routine testing and adjustment. In addition to the system parameters discussed above, the preferred current is a pulsed DC current of from about 250 $A/cm^2$ to about 10,000 $A/cm^2$, most preferably from about 500 $A/cm^2$ to about 1,500 $A/cm^2$. Regarding the pressure, a pressure of about 10 MPa or higher will generally provide the best results, although pressures within the range of from about 10 MPa to about 200 MPa are preferred, and pressures within the range of from about 40 MPa to about 100 MPa are the most preferred. The pressure is typically applied by uniaxial compression under vacuum, and preferred vacuum levels for the densification are below 10 Torr, and most preferably below 1 Torr.

The processing conditions can be used to achieve full density, i.e., a density equal to the theoretical density to an accuracy of one decimal point, i.e., 99.9% theoretical density or greater. In general, however, the beneficial effects of this invention will be achieved with final products that are slightly less than full density, such as those have a density of about 98% or greater, or preferably about 99% or greater, of the theoretical density. The theoretical density and means of calculating the theoretical density are well known to those skilled in the art. In general, the theoretical density is that which the material would have if no discontinuities at all were present in the material.

The following examples are offered for purposes of illustration and are not intended to limit the scope of the invention.

EXAMPLES

Materials, Equipment, and Experimental Procedures

Barium titanate powder, prepared by the hydrothermal reaction of barium hydroxide with titanium hydroxide and having an average particle size of 60 nm, was obtained from Cabot Corporation (Boston, Mass., USA).

The powder was placed on a graphite die of inner diameter 20 mm and cold-pressed at 200 MPa to form green body pellets whose density was approximately 57% of the theoretical density. The pellets were then sintered under vacuum on a Dr. Sinter 1050 Spark Plasma Sintering System (Sumitomo Coal Mining Company, Japan). Sintering was performed at an applied pressure of 63 MPa with a pulsed DC current of about 2,000 A and a maximum voltage of 10 V, with a pulse duration time of 12 ms separated by intervals of 2 ms. Once the pressure was applied, the samples were heated to 600° C. in 2 minutes. Different pellets were then raised to their different final sintering temperatures (900° C., 1,000° C., and 1,150° C.) at different rates (300° C./min, 400° C./min, and 275° C./min) and held at the sintering temperatures for three minutes. The temperature of each pellet was monitored with an optical pyrometer focused on a depression in the graphite die measuring 2 mm in diameter and 5 mm in depth. At the end of the sintering time in each case, the pellets were allowed to cool. The pressure was removed during cooling to prevent the pellets from cracking as they were cooled.

The final densities of the sintered pellets were measured by the Archimedes method using deionized water as the immersion medium. Microstructure determinations of the sintered pellets were performed with an FEI XL30-SFEG high-resolution scanning electron microscope with a resolution of less than 2 nm. Grain sizes were estimated by high-resolution scanning electron microscopy of fractured surfaces. The phase composition was determined by use of a Scintag XDS-2000 x-ray diffractometer, operating at 40 mA and 45 kV using CuKα radiation. Prior to obtaining dielectric data on the pellets, each pellet was polished to remove graphite contamination layers and then coated with silver paste electrodes that were fired at 750° C. for thirty minutes. Measurements of the dielectric constant were made on a precision impedance analyzer (HP4294A) over a temperature range of 24 to 400° C. while heating or cooling at a rate of 2.5° C. per minute, and at various frequencies between 50 Hz and 1 MHz with an applied voltage of 100 mV.

Results

The relative density, grain size (both the starting powder and the sintered product), Curie temperature, and dielectric constant at 1 kHz and 25° C. were determined on three sintered barium titanate pellets prepared as described above, and the results are listed in the following table, together with the processing conditions for each pellet plus corresponding processing conditions and data taken from three literature references on barium titanate pellets processed in accordance with the prior art. The values representing the results of the experiments described herein each represent an average of two pellets.

Relative Densities, Grain Sizes, Curie Temperatures, and Dielectric Constants of Barium Titanate Densified by Spark Plasma Sintering Under Various Conditions

| No. | Spark Plasma Sintering Processing Conditions | | Relative Density (%) | Grain Size Powder/Product (nm) | Curie Temperature (° C.) | Dielectric Constant at 1 kHz/25° C. | Source |
|---|---|---|---|---|---|---|---|
| | Heating Rate Above 600° C. | Sinterin Temperature/-Time | | | | | |
| (1) | 300° C./min | 900° C./3 min | 92 | 60/~100 | — | — | herein |
| (2) | 400° C./min | 1,000° C./3 min | 100 | 60/~200 | ~126 | ~10,007 | herein |
| (3) | 275° C./min | 1,150° C./3 min | 100 | 60/15,600 | — | — | herein |
| (4) | 200° C./min | 1,000–1,200° C./-5 min | ~98 | 100–500/~600 | 120 | ~7,000 | (i) |
| (5) | 200° C./min | 900–1,000° C./-3 min | ~98 | -/~400 | 130 | ~7,000 | (ii) |
| (6) | 160° C./min | 900–1,200° C./-3 min | ~98 | 70–600/~500 | ~115 | ~3,500 | (iii) |

(i) Takeuchi, T., M. Tabuchi, and H. Kageyama, "Preparation of dense BaTiO$_3$ ceramics with submicrometer grains by spark plasma sintering," *J. Am. Chem. Soc.* 82 [4] 939–943 (1999)

(ii) Takeuchi, T., Y. Suyama, D. Sinclair, and H. Kageyama, "Spark-plasma-sintering of fine BaTiO$_3$ powder prepared by a sol-crystal method," *J. Mater. Sci.* 36 (2001), pages 2329–2334

(iii) Takeuchi, T., C. Capiglia, N. Balakrishnan, Y. Takeda, and H. Kageyama, "Preparation of fine-grained BaTiO$_3$ ceramics by spark plasma sintering," *J. Mater. Res.* 17[3]: 575–581 (2002)

The data in this table demonstrate the superior density, grain size, and dielectric constant of barium titanate sintered at a sintering temperature of 1,000° C. reached by a heating rate of 400° C./min (data row no. 2). The superior density is demonstrated relative to that obtained at a sintering temperature of 900° C. reached by a heating rate of 300° C./min (data row no. 1), and the superior grain size is demonstrated relative to that obtained at a sintering temperature of 1,150° C. reached by heating rate of 275° C./min (data row no. 3). The superior dielectric constant is demonstrated relative to those of barium titanate sintered at heating rates of 160° C./min (data row no. 6) and 200° C./min (data row nos. 4 and 5). The data also show that only a slight drop in Curie temperature occurs between the optimum sample of this invention (data row no. 2) and the maximum value from the literature (data row no. 5).

The variation of permittivity at 25° C. with frequency is shown in FIG. 1, where the frequency was varied over a frequency range of log frequency=1.5 to 6 and the sample tested was that represented by data row no. 2 in the table above. To reiterate, the starting material for the latter was 60 nm barium titanate particles prepared by hydrothermal synthesis, and processing consisted of sintering at a heating rate of 400° C./min to a sintering temperature of 1,000° C. for three minutes. Data were taken both as the frequency was increasing and as the frequency was decreasing, the data taken with an increasing frequency represented in the plot by circles and the data taken with a decreasing frequency represented in the plot by diamonds. The two curves do not overlap over their entire range and thereby demonstrate hysteresis, but both contain a discontinuity in the dielectric constant at a log frequency value of between 3 and 3.5, indicating a possible utility of the material as a frequency-operated switch material.

Figure 2:
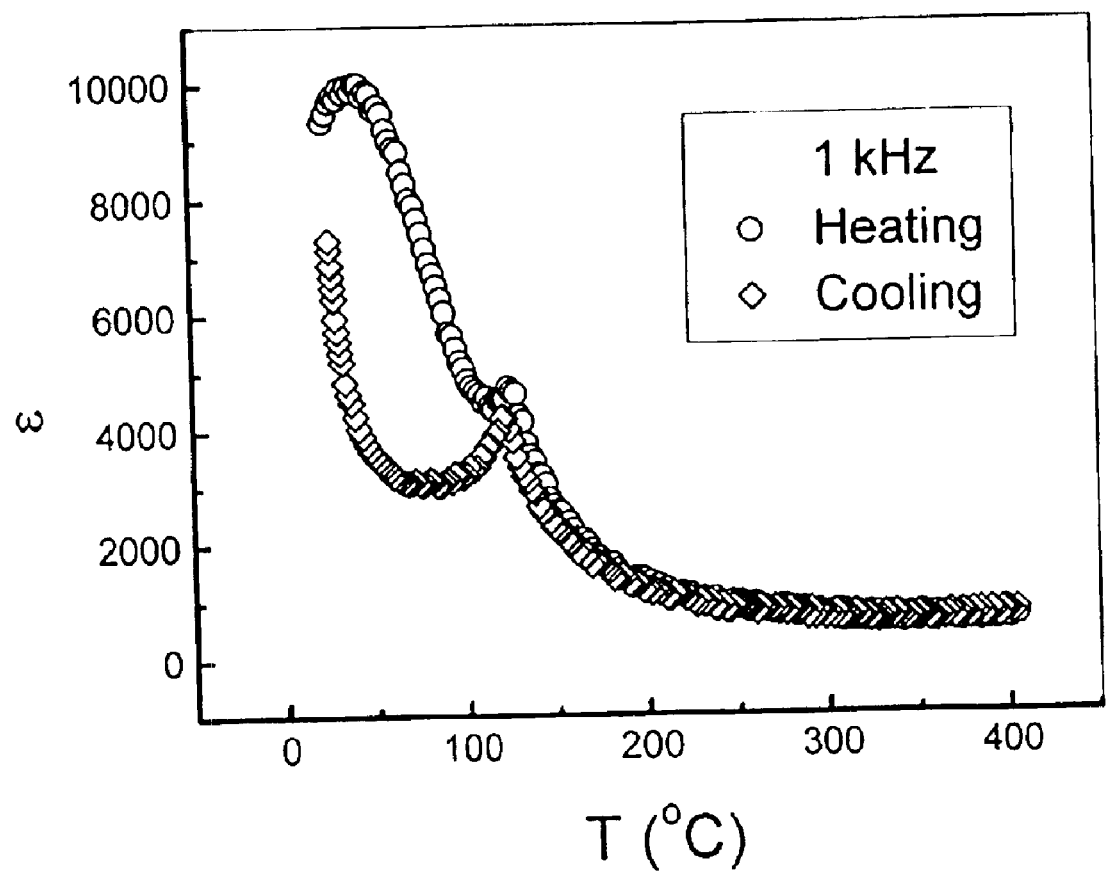
FIG. 2 is a plot showing the variation of permittivity with temperature at a frequency of 1 kHz for a barium titanate material sintered in accordance with the present invention.

The variation of permittivity at a frequency of 1 kHz with temperature is shown in FIG. 2. Hysteresis is shown here as well, with the data taken as the temperature was rising represented by circles and the data taken as the temperature was dropping represented by diamonds. The permittivity at 25° C. was highest in the heating portion of the cycle.

Figure 3:
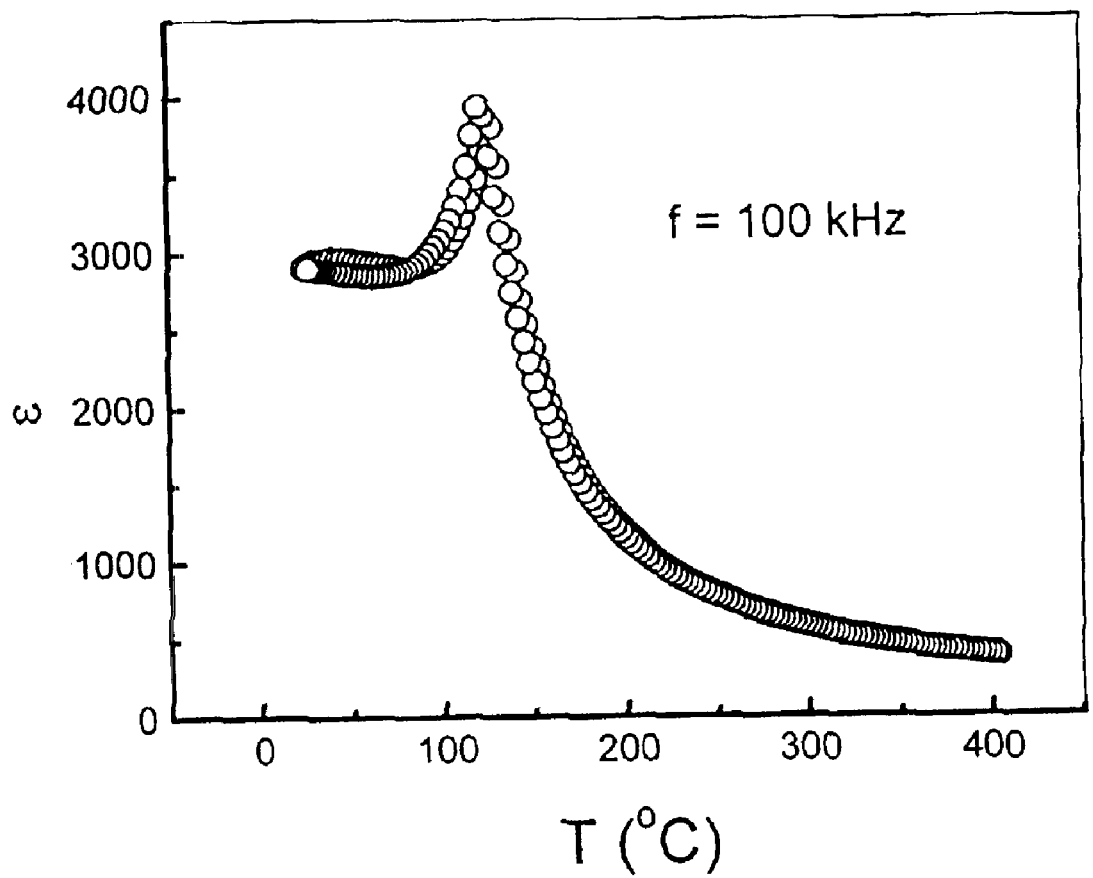
FIG. 3 is a plot showing the variation of permittivity with temperature at a frequency of 100 kHz for a barium titanate material sintered in accordance with the present invention.

The variation of permittivity at a frequency of 100 kHz with temperature is shown in FIG. 3. Here as well, data was taken both as the temperature was increased and as it was decreased, but no hysteresis was observed. The maximum permittivity was achieved at approximately 126° C.

Figure 4:
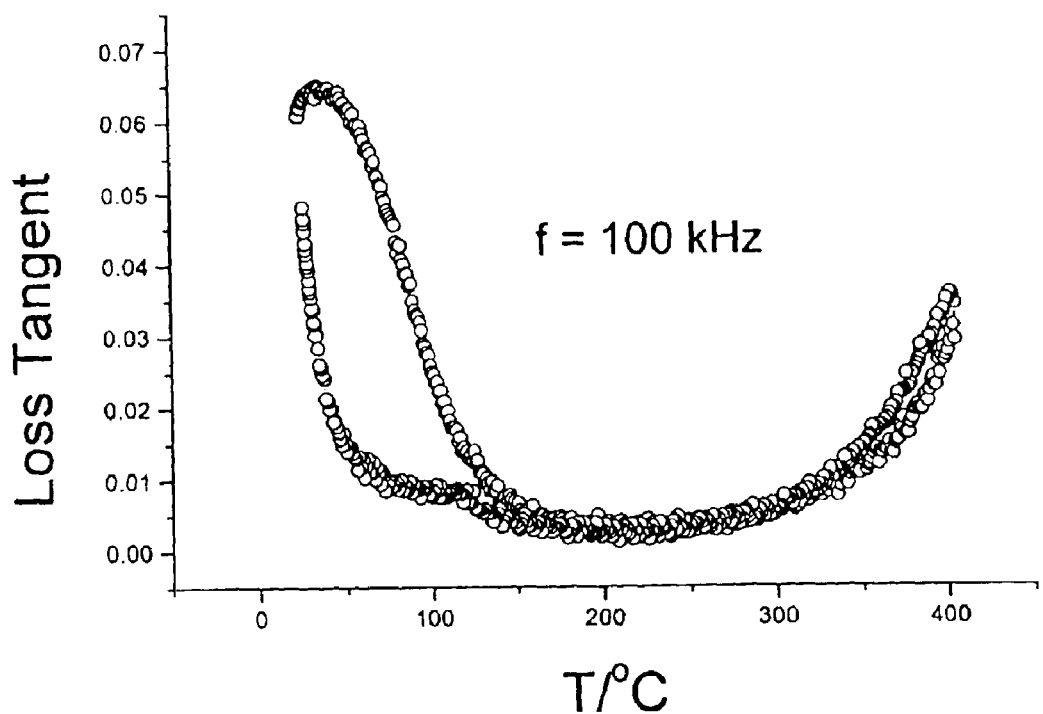
FIG. 4 is a plot showing the variation of loss tangent with temperature at a frequency of 100 kHz for a barium titanate material sintered in accordance with the present invention.

The loss tangent variation over a temperature range of 24–400° C. at a frequency of 100 kHz is shown in FIG. 4. Once again, hysteresis is shown, but the loss tangent remains close to zero at temperatures ranging from about 150° C. to about 300° C.

The foregoing is offered primarily for purposes of illustration and explanation. Further variations, modifications and substitutions that, even though not disclosed herein, still fall within the scope of the invention may readily occur to those skilled in the art.

What is claimed is:

1. A process for the preparation of a dense body of barium titanate, said process comprising consolidating a powder mixture of barium titanate particles having diameters of at most about 100 nm into a consolidated mass, and compressing said consolidated mass while sintering said consolidated mass by spark plasma sintering under processing conditions causing said consolidated mass to rise to a sintering temperature of at least about 900° C. at a heating rate which, once said consolidated mass surpasses about 600° C., is at least about 350° C. per minute, to produce a barium titanate body having at least 98% theoretical density.

2. A process in accordance with claim 1 in which said heating rate, once said consolidated mass surpasses about 600° C., is within a range of from about 350° C. per minute to about 750° C. per minute.

3. A process in accordance with claim 1 in which said heating rate, once said consolidated mass surpasses about 600° C., is within a range of from about 400° C. per minute to about 550° C. per minute.

4. A process in accordance with claim 1 in which said sintering temperature is within a range of from about 900° C. to about 1,100° C.

5. A process in accordance with claim 1 in which said sintering temperature is within a range of from about 950° C. to about 1,050° C.

6. A process in accordance with claim 1 comprising holding said consolidated mass at said sintering temperature for a period of time ranging from about 1 minute to about 10 minutes.

7. A process in accordance with claim 1 comprising holding said consolidated mass at said sintering temperature for a period of time ranging from about 2 minutes to about 5 minutes.

8. A process in accordance with claim 1 in which said barium titanate particles are formed by hydrothermal conversion of barium hydroxide and titanium hydroxide.

9. A process in accordance with claim 1 in which said processing conditions are selected to produce a barium titanate body having a density of at least 99% theoretical density.

10. A process in accordance with claim 1 in which said processing conditions are selected to produce a barium titanate body having a density of at least 99.9% theoretical density.

11. A process in accordance with claim 1 in which said sintering temperature is within a range of from about 950° C. to about 1,050° C. and said process comprises holding said consolidated mass at said sintering temperature for a period of time ranging from about 2 minutes to about 5 minutes.

12. A body of barium titanate prepared by the process of claim 11.

13. A body of barium titanate prepared by the process of claim 11 and having a grain size not exceeding about 500 nm in diameter.

14. A body of barium titanate prepared by the process of claim 11 and having a grain size not exceeding about 300 nm in diameter.

15. A body of barium titanate prepared by the process of claim 11 and having a grain size not exceeding about 250 nm in diameter.

16. A body of barium titanate prepared by the process of claim 11 and having a grain size not exceeding about 200 nm in diameter.

17. A body of barium titanate prepared by the process of claim 1.

18. A body of barium titanate prepared by the process of claim 1 and having a grain size not exceeding about 500 nm in diameter.

19. A body of barium titanate prepared by the process of claim 1 and having a grain size not exceeding about 300 nm in diameter.

20. A body of barium titanate prepared by the process of claim 1 and having a grain size not exceeding about 250 nm in diameter.

21. A body of barium titanate prepared by the process of claim 1 and having a grain size not exceeding about 200 nm in diameter.

* * * * *